US007584274B2

(12) United States Patent  (10) Patent No.: US 7,584,274 B2
Bond et al. (45) Date of Patent: Sep. 1, 2009

(54) COORDINATING USE OF INDEPENDENT EXTERNAL RESOURCES WITHIN REQUESTING GRID ENVIRONMENTS

(75) Inventors: Robert W. Bond, Powder Springs, GA (US); Douglas J. McCulloch, Marietta, GA (US); Patrick J. Richards, Jr., Marietta, GA (US); Sambasiva R. Tallam, Alpharetta, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 866 days.

(21) Appl. No.: 10/868,542

(22) Filed: Jun. 15, 2004

(65) Prior Publication Data

US 2005/0278441 A1 Dec. 15, 2005

(51) Int. Cl.
 *G06F 15/16* (2006.01)
(52) U.S. Cl. ........................ 709/223; 709/227; 709/229; 709/249; 370/245; 702/188
(58) Field of Classification Search ................. 709/223, 709/227, 249, 229; 364/550; 702/188; 370/245
See application file for complete search history.

(56) References Cited

U.S. PATENT DOCUMENTS

| | | | | |
|---|---|---|---|---|
| 4,591,980 | A | 5/1986 | Huberman et al. | 364/200 |
| 5,220,674 | A * | 6/1993 | Morgan et al. | 709/223 |
| 5,630,156 | A | 5/1997 | Privat et al. | 395/800 |
| 5,729,472 | A | 3/1998 | Seiffert et al. | 364/550 |
| 5,884,046 | A * | 3/1999 | Antonov | 709/238 |
| 5,931,911 | A | 8/1999 | Remy et al. | 709/223 |

(Continued)

FOREIGN PATENT DOCUMENTS

EP 0790559 A 8/1997

(Continued)

OTHER PUBLICATIONS

Tomothy H. Heil and James E. Smith, Concurrent Garbage Collection Using Hardware-Assisted Profiling, (Jan. 2001), ACM SIGPLAN Notices archive; vol. 36, Issue 1 ; pp. 80-93 ; ISSN:0362-1340.*

(Continued)

*Primary Examiner*—Salad Abdullahi
*Assistant Examiner*—Anthony Fabbri
(74) *Attorney, Agent, or Firm*—John Pivnichny; Amy J. Pattillo

(57) ABSTRACT

A method, system, and program for coordinating use of independent external resources within requesting grid environments. A external resource dispatcher receives requests for use of external resources. The external resource dispatcher controls the dispatch of a pool of external resources hidden from the grid management systems of requesting grid clients. In particular, the external resource dispatcher coordinates dispatch of a selection of the external resources for temporary registration with a requesting grid client management system. The requesting grid client management system registers the external resources for use within the grid client and monitors whether the external resources are still needed. When a requesting grid client no longer needs a dispatched external resource, the external resource dispatcher controls detachment of the dispatched external resource and returns the external resource to the available pool of external resources.

5 Claims, 5 Drawing Sheets

U.S. PATENT DOCUMENTS

| | | | |
|---|---|---|---|
| 6,049,828 A * | 4/2000 | Dev et al. | 709/224 |
| 6,154,787 A * | 11/2000 | Urevig et al. | 710/8 |
| 6,167,445 A * | 12/2000 | Gai et al. | 709/223 |
| 6,182,139 B1 | 1/2001 | Brendel | 709/226 |
| 6,310,889 B1 * | 10/2001 | Parsons et al. | 370/466 |
| 6,430,711 B1 * | 8/2002 | Sekizawa | 714/47 |
| 6,452,692 B1 * | 9/2002 | Yacoub | 358/1.15 |
| 6,460,082 B1 | 10/2002 | Lumelsky et al. | 709/226 |
| 6,463,454 B1 * | 10/2002 | Lumelsky et al. | 718/105 |
| 6,470,384 B1 * | 10/2002 | O'Brien et al. | 709/223 |
| 6,499,049 B2 * | 12/2002 | Waldo et al. | 718/104 |
| 6,552,813 B2 * | 4/2003 | Yacoub | 358/1.1 |
| 6,560,609 B1 * | 5/2003 | Frey et al. | 707/103 R |
| 6,578,160 B1 * | 6/2003 | MacHardy et al. | 714/43 |
| 6,625,643 B1 * | 9/2003 | Colby et al. | 709/217 |
| 6,654,759 B1 * | 11/2003 | Brunet et al. | 707/101 |
| 6,654,807 B2 * | 11/2003 | Farber et al. | 709/225 |
| 6,701,342 B1 | 3/2004 | Bartz et al. | |
| 6,714,987 B1 * | 3/2004 | Amin et al. | 709/249 |
| 6,717,694 B1 | 4/2004 | Fukunaga et al. | |
| 6,732,117 B1 * | 5/2004 | Chilton | 707/103 X |
| 6,742,015 B1 * | 5/2004 | Bowman-Amuah | 718/101 |
| 6,751,662 B1 * | 6/2004 | Natarajan et al. | 709/223 |
| 6,816,905 B1 * | 11/2004 | Sheets et al. | 709/226 |
| 6,941,865 B2 | 9/2005 | Kato | |
| 6,954,739 B1 * | 10/2005 | Bouillet et al. | 705/63 |
| 6,963,285 B2 * | 11/2005 | Fischer et al. | 340/635 |
| 7,050,184 B1 | 5/2006 | Miyamoto | |
| 7,086,086 B2 | 8/2006 | Ellis | |
| 7,096,248 B2 * | 8/2006 | Masters et al. | 709/201 |
| 7,123,375 B2 | 10/2006 | Nobutani et al. | |
| 7,171,654 B2 * | 1/2007 | Werme et al. | 717/130 |
| 7,181,302 B2 * | 2/2007 | Bayne | 700/96 |
| 7,181,743 B2 * | 2/2007 | Werme et al. | 718/104 |
| 7,243,121 B2 | 7/2007 | Neiman et al. | |
| 7,245,584 B2 | 7/2007 | Goringe et al. | |
| 7,269,757 B2 | 9/2007 | Lieblich et al. | |
| 7,340,654 B2 * | 3/2008 | Bigagli et al. | 714/47 |
| 7,426,267 B1 | 9/2008 | Caseau | |
| 7,433,931 B2 * | 10/2008 | Richoux | 709/217 |
| 7,437,675 B2 | 10/2008 | Casati et al. | |
| 7,451,106 B1 | 11/2008 | Gindlesperger | |
| 2002/0023168 A1 | 2/2002 | Bass et al. | |
| 2002/0072974 A1 * | 6/2002 | Pugliese et al. | 705/14 |
| 2002/0152305 A1 * | 10/2002 | Jackson et al. | 709/224 |
| 2002/0152310 A1 | 10/2002 | Jain et al. | 709/226 |
| 2002/0165979 A1 | 11/2002 | Vincent | 709/239 |
| 2002/0171864 A1 | 11/2002 | Sesek | |
| 2002/0188486 A1 | 12/2002 | Gil et al. | |
| 2003/0011809 A1 | 1/2003 | Suzuki et al. | |
| 2003/0036886 A1 | 2/2003 | Stone | 702/188 |
| 2003/0058797 A1 | 3/2003 | Izmailov et al. | |
| 2003/0101263 A1 | 5/2003 | Bouillet et al. | |
| 2003/0105868 A1 | 6/2003 | Kimbrel et al. | 709/226 |
| 2003/0108018 A1 | 6/2003 | Dujardin et al. | |
| 2003/0120701 A1 | 6/2003 | Pulsipher et al. | 709/102 |
| 2003/0126240 A1 * | 7/2003 | Vosseler | 709/221 |
| 2003/0126265 A1 * | 7/2003 | Aziz et al. | 709/227 |
| 2003/0140143 A1 * | 7/2003 | Wolf et al. | 709/225 |
| 2003/0161309 A1 | 8/2003 | Karuppiah | |
| 2003/0191795 A1 | 10/2003 | Bernardin et al. | 709/105 |
| 2003/0200347 A1 | 10/2003 | Weitzman | 709/310 |
| 2003/0204758 A1 * | 10/2003 | Singh | 713/320 |
| 2003/0212782 A1 | 11/2003 | Canali et al. | |
| 2004/0064548 A1 | 4/2004 | Adams et al. | |
| 2004/0095237 A1 * | 5/2004 | Chen et al. | 340/506 |
| 2004/0103339 A1 * | 5/2004 | Chalasani et al. | 714/4 |
| 2004/0145775 A1 | 7/2004 | Kubler et al. | |
| 2004/0213220 A1 * | 10/2004 | Davis | 370/389 |
| 2004/0215590 A1 | 10/2004 | Kroening | |
| 2005/0027865 A1 | 2/2005 | Bozak et al. | |
| 2005/0065994 A1 | 3/2005 | Creamer et al. | |
| 2005/0108394 A1 | 5/2005 | Braun et al. | |
| 2005/0138162 A1 | 5/2005 | Byrnes | |
| 2005/0120160 A1 | 6/2005 | Plouffe et al. | |
| 2005/0182838 A1 * | 8/2005 | Sheets et al. | 709/226 |
| 2006/0075042 A1 * | 4/2006 | Wang et al. | 709/206 |

FOREIGN PATENT DOCUMENTS

EP    1267552 A    12/2002

OTHER PUBLICATIONS

Ian Foster; What is the Grid? A Three Point Checklist; Jul. 22, 2002; Grid Today: vol. 1 No. 6.*

Tomothy H. Heil and James E. Smith, Concurrent Garbage Collection Using Hardware-Assisted Profiling, (Jan. 2001), ACM SIGPLAN Notices archive; vol. 36, Issue 1 o pp. 80-93 o ISSN:0362-1340.*

Foster et al.; The Anatomy of the Grid, Enabling Scalable Virtual Organizations; 2001; available at www.globus.org/research/papers/anatomy.pdf as of Nov. 27, 2003.

Foster et al.; The Physiology of the Grid, An Open Grid Services Architecture for Distributed Systems Integration; Jun. 22, 2002; available at www.globus.org/research/papers/ogsa.pdf as of Nov. 27, 2003.

Foster, Ian; What is the Grid? A Three Point Checklist; Jul. 20, 2002; available at www-fp.mcs.anl.gov/~foster/Articles/WhatIsTheGrid.pdf as of Nov. 27, 2003.

Ferreira et al.; IBM Redpaper—Globus Toolkit 3.0 Quick Start; Sep. 2003; available at www.redbooks.ibm.com/redpapers/pdfs/redp369 as of Nov. 27, 2003.

IBM Grid Computing—What is Grid Computing; available at www-1.ibm.com/grid/about_grid/what_is.shtml as of Nov. 27, 2003.

Berstis, Viktors; IBM Redpaper—Fundamentals of Grid Computing; 2002; available at www.redbooks.ibm.com/redpapers/pdfs/redp3613.pdf as of Nov. 27, 2003.

Jacob, Bart; IBM Grid Computing—Grid Computing: What are the key components?; Jun. 2003; available at www-106.ibm.com/developerworks/grid/library/gr-overview/ as of Nov. 27, 2003.

Unger et al.; IBM Grid Computing—A Visual Tour of Open Grid Services Architecture; Aug. 2003; available at www-106.ibm.com/developerworks/grid/library/gr-visual/ as of Nov. 27, 2003.

Edited by Rajkumar Buyya; Grid Computing Info Centre: Frequently Asked Questions (FAQ); available at http://www.cs.mu.oz.au/~raj/GridInfoware/gridfaq.html as of Nov. 27, 2003.

IBM Research Disclosure, "Process and Method for IT energy optimization", Feb. 2002, n454196 p. 366.

Zhu et al., "Scheduling Optimization for resource-intensive Web requests on server clusters", ACM Symposium on Parallel Algorithms and Architectures, 1999, p. 13-22.

Rumsewicz et al, "Preferential Load Balancing for Distributed Internet Servers", Cluster Computing and the Grid, Proceedings. First IEEE/ACM International Symposium, May 2001, p. 363-370.

Kim et al., "Request Rate adaptive dispatching architecture for scalable Internet Server", Cluster Computing, 2000, Proceedings. IEEE conference on Nov. 28-Dec. 1, 2000, p. 289-296.

Casalicchio et al, "Scalable Web Clusters with Static and Dynamic Contents", Cluster Computing, 2000, Proceedings. IEEE conference on Nov. 28-Dec. 1, 2000, p. 170-177.

Fox et al, "Cluster-based scalable network services", Oct. 1997 ACM SIGOPS Operating Systems Review, Proceedings of the 16th ACM symposium on operating systems principles, vol. 31, Issue 5, p. 78-91.

Massie ML et al, "The Ganglia Distributed Monitoring System: Design, Implementation, and Experience" Parallel Computing Elsevier Netherlands, vol. 30, No. 7, Jul. 2004, pp. 817-840.

Fenglian Xu et al, "Tools and Support for Deploying Applications on the Grid" Services Computing, 2004. Proceedings 2004 International Conference on Shanghai, China, Sep. 15-18, 2004, Piscataway, NJ, IEEE, pp. 281-287.

Ian Foster and Carl Kesselman, "Grid2—Blueprint for a New Computing Infrastructure" 2004, Elsevier, San Francisco, CA, chapter 20, Instrumentation and Monitoring, pp. 319-343.

Smallen S et al, "The Inca Test Harness and Reporting Framework" Supercomputing 2004. Proceedings of the ACM/IEEE SC2004 Conference Pittsburgh, PA, Nov. 2004, p. 1-10.

Allen G, et al, "The Cactus Worm: Experiments with Dynamic Resource Discovery and Allocation in a Grid Environment", International Journal of High Performance Computing Applications, Sage Science Press, Thousand Oaks, US, vol. 15, No. 4, 2001, pp. 345-358.

Hwa Min Lee, " A Fault Tolerance Service for QoS in Grid Computing", Lecture Notes in Computer Science, vol. 2659, Aug. 2003, pp. 286-296.

Tianyi Zang, et al, "The Design and Implementation of an OGSA-based grid information service" Web Services, 2004. Proceedings IEEE International Conference on San Diego CA, Piscataway, NJ, IEEE, Jul. 6, 2004, pp. 566-573.

Sample N, et al, "Scheduling Under Uncertainty: Planning for the Ubiquitous Grid", Coordination Models and Languages, 5th International Conference, Coordination 2002. Proceedings (Lecture Notes in Computer Science, vol. 2315) Springer-Varlag Berlin, Germany, 2002, pp. 300-316.

Gever DH, et al, "WWW-based high performance computing support of acoustic matched field processing", MTS/IEEE Oceans 2001. An Ocean Odessey. Conference Proceedings (IEEE Cat. No. 01CH37295) Marine Technology Soc. Washington, DC, vol. 4, 2001, pp. 2541-2548.

Chase, JS et al, "Dynamic Virtual Clusters in a Grid Site Manager", High Performance Distributed Computing 2003. Proceedings. 12th IEEE International Symposium, Jun. 22-24, 2003, Piscataway, NJ, USA, IEEE, pp. 90-100.

"Method of Providing On-Demand-Computing for Server Blades", IP.com Journal, IP.com Inc., West Henrietta, NY, US, Sep. 8, 2003, p. 1.

Kubicek, C, et al., "Dynamic Allocation of Servers to Jobs in a Grid Hosting Environment", BY Technology Journal, vol. 22, No. 3, Jul. 2004, pp. 251-260.

Yang, Kun, et al, "Network Engineering Towards Efficient Resource On-Demand in Grid Computing", Communication Technology Proceedings, 2003, ICCT 2003, International Conference on Apr. 9-11, 2003, Piscataway, NJ, USA, IEEE, vol. 2, Apr. 9, 2003, pp. 1715-1718.

Chase, J S et al, "Dynamic Virtual Clusters in a Grid Site Manager", High Performance Distributed Computing, 2003. Proceedings. 12th IEEE International Symposium, Jun. 22-24, 2003, Piscataway, NJ, USA, IEEE, pp. 90-100.

"Method of Providing On-Demand-Computing for Server Blades", IP.Com Journal, IP.Com Inc., West Henrietta, NY, US, Sep. 8, 2003, p. 1.

Kubicek, C., et al., "Dynamic Allocation of Servers to Jobs in a Grid Hosting Environment", BT Technology Journal, vol. 22., No. 3, Jul. 2004, pp. 251-260.

Yang, Kun, et al, "Network Engineering Towards Efficient Resource on-Demand in Grid Computing", Communication Technology Proceedings, 2003, ICCT 2003, International Conference on Apr. 9-11, 2003, Piscataway, NJ, USA, IEEE, vol. 2, Apr. 9, 2003, pp. 1715-1718.

Moore, Justin and Chase, Jeff, "Cluster on Demand" Technical Report No. CS-2007-07, Duke University, May 2002, pp. 1-25.

Fault-Tolerant Grid Architecture and Practice, Jul. 2003, vol. 18, pp. 423-433, J. Comput Sci and Technol, Hai et al.

Al-Theneyan, Ahmed Hamdan, "A Policy-Based Resource Brokering Environment for Computational Grids" (2002) PHD Dissertation, Old Dominion University, United States—Virginia.

Leff, Avraham, "Service Level Agreements and Commercial Grids", IEEE Internet Computing (Jul.-Aug. 2003): pp. 44-50.

Hill, J.R. "A Management Platform for Commercial Web Services." BT Technology Journal (Jan. 2004): vol. 22, No. 1, pp. 52-62).

Alexander Keller and Heiko Ludwig, "The WSLA Framework: Specifying and Monitoring Service Level Agreements for Web Services." Journal of Network and Systems Management, vol. 11, No. 1, Mar. 2003, pp. 57-81.

Menasce, Daniel A, "QOS in Grid Computing", IEEE Internet Computing (Jul.-Aug. 2004), pp. 85-87.

T Boden, "The Grid Enterprise—Structuring the Agile Business of the Future." BT Technology Journal, vol. 22, No. 1, Jan. 2004, pp. 107-117.

USPTO Office Action, U.S. Appl. No. 11/031,403, Mailing Date Oct. 24, 2008, 19 pages.

Rolia, Jerry et al, "Service Centric Computing—Next Generation Internet Computing", 2002, Springer-Verlag Berlin Heidelberg, pp. 463-479.

Belloum, Adam et al, "VLAM-G: a grid-based virtual laboratory", 2002, Future Generation Computer Systems 19, Elsevier Science B.V., pp. 209-217.

Min, D. and Mutka, M., "Efficient Job Scheduling in a Mesh Multicomputer Without Discrimination Against Large Jobs", 1995, IEEE., pp. 52-59.

Office Action, U.S. Appl. No. 11/031,403, filed Jan. 6 ,2005, Mailed Apr. 24, 2009.

Office Action, U.S. Appl. No. 11/031,426, Filed Jan. 6. 2005, Mailed Apr. 1, 2009.

* cited by examiner

COORDINATING USE OF INDEPENDENT EXTERNAL RESOURCES WITHIN REQUESTING GRID ENVIRONMENTS

BACKGROUND OF THE INVENTION

1. Technical Field

The present invention relates in general to improved performance and efficiency in grid environments and in particular to a method for controlling use of independent external resources by requesting grid management systems. Still more particularly, the present invention relates to controlling dispatch, metering use, and monitoring connectivity of a selection of independent external resources made accessible to a particular requesting grid management system.

2. Description of the Related Art

Ever since the first connection was made between two computer systems, new ways of transferring data, resources, and other information between two computer systems via a connection continue to develop. In typical network architectures, when two computer systems are exchanging data via a connection, one of the computer systems is considered a client sending requests and the other is considered a server processing the requests and returning results. In an effort to increase the speed at which requests are handled, server systems continue to expand in size and speed. Further, in an effort to handle peak periods when multiple requests are arriving every second, server systems are often joined together as a group and requests are distributed among the grouped servers. Multiple methods of grouping servers have developed such as clustering, multi-system shared data (sysplex) environments, and enterprise systems. With a cluster of servers, one server is typically designated to manage distribution of incoming requests and outgoing responses. The other servers typically operate in parallel to handle the distributed requests from clients. Thus, one of multiple servers in a cluster may service a client request without the client detecting that a cluster of servers is processing the request.

Typically, servers or groups of servers operate on a particular network platform, such as Unix or some variation of Unix, and provide a hosting environment for running applications. Each network platform may provide functions ranging from database integration, clustering services, and security to workload management and problem determination. Each network platform typically offers different implementations, semantic behaviors, and application programming interfaces (APIs).

Merely grouping servers together to expand processing power, however, is a limited method of improving efficiency of response times in a network. Thus, increasingly, within a company network, rather than just grouping servers, servers and groups of server systems are organized as distributed resources. There is an increased effort to collaborate, share data, share cycles, and improve other modes of interaction among servers within a company network and outside the company network. Further, there is an increased effort to outsource nonessential elements from one company network to that of a service provider network. Moreover, there is a movement to coordinate resource sharing between resources that are not subject to the same management system, but still address issues of security, policy, payment, and membership. For example, resources on an individual's desktop are not typically subject to the same management system as resources of a company server cluster. Even different administrative groups within a company network may implement distinct management systems.

The problems with decentralizing the resources available from servers and other computing systems operating on different network platforms, located in different regions, with different security protocols and each controlled by a different management system, has led to the development of Grid technologies using open standards for operating a grid environment. Grid environments support the sharing and coordinated use of diverse resources in dynamic, distributed, virtual organizations. A virtual organization is created within a grid environment when a selection of resources, from geographically distributed systems operated by different organizations with differing policies and management systems, is organized to handle a job request.

A problem encountered in most network systems, whether organized in clusters or grids, is how to handle requests during peak usage times. One solution for handling requests during peak usage is to register sufficient resources with the resource manager of the cluster or grid so that the network can access sufficient resources to handle predicted peak usage. This solution helps to ensure maintenance of performance standards, however, it may also be cost ineffective to purchase resources that are only used for short bursts of time. Another solution for handling requests during peak usage is to register a pool of reserve or on-demand resources to the resource manager so that the network can access these reserved resources only during peak usage times and may pay only for use of the reserved resources. While both of these solutions provide methods of maintaining performance during peak usage, both are limited in that the pool of additional resources are registered as on reserve with the resource manager of a particular resource manager.

In view of the foregoing, it would be advantageous to provide a method, system, and program for controlling use of independent external resources by multiple requesting grid resource managers. In particular, it would be advantageous to control external resources available in a resource pool independent of a requesting grid resource manager. Further, it would be advantageous to provide a method, system, and program for dispatching independent external resources among multiple requesting grids, metering the use of independent external resources by multiple requesting grids, and polling the external resources to ensure connectivity to the multiple requesting grids.

SUMMARY OF THE INVENTION

In view of the foregoing, the method, system, and program provide improved performance in grid environments and in particular provide for controlling use of independent external resources by requesting grid management systems. Still more particularly, the method, system, and program provide for controlling dispatch, metering use, and monitoring connectivity of a selection of independent external resources made accessible to a particular requesting grid management system.

According to one aspect of the invention, an external resource dispatcher receives requests for use of resources. The external resource dispatcher controls the dispatch of a pool of external resources hidden from the grid management systems of requesting grid clients. The external resource dispatcher may first authenticate the identity of a requesting grid client and determine whether the requesting grid client is authorized to receive the requested resources. Then, the external resource dispatcher determines whether there are any external resources available to meet the resource request. In particular, the external resource dispatcher tracks and controls the availability status of the external resources. The external resource dispatcher coordinates dispatch of a selection of the external resources for temporary registration with a requesting grid management system. The requesting grid management system registers the external resources and monitors whether the external resources are still needed. When a requesting grid client no longer needs a dispatched external resource, the external resource dispatcher controls detachment of the dispatched external resource and returns the external resource to the available pool of external resources.

According to another aspect of the invention, the external resource dispatcher establishes heartbeats with the grid management system and the dispatched external resource. The external resource dispatcher polls the grid management system to determine if there is connectivity between the grid management system and the dispatched external resource. If the external resource dispatcher does not detect a heartbeat, the external resource dispatcher will detach the dispatched external resource and return the external resource to the available external resource pool. In addition, if the external resource dispatcher does not detect a heartbeat from the dispatched external resource, then the external resource dispatcher will mark the dispatched external resource as failed and dispatch a replacement resource to the grid management system.

According to yet another aspect of the invention, the external resource dispatcher is self-registering with an external resource dispatcher directory. Thus, multiple grid management systems may access and send requests for external resources to the external resource dispatcher.

According to a further aspect of the invention, the external resource dispatcher meters the use of dispatched external resources by grid clients. Advantageously, external resource dispatcher independently meters usage such that costs for use of external resources can be determined based on an independent metering of usage. In one example, a grid management system may be registered with an external resource dispatcher with limits on the number of hours or cost per period of time available for metering use of external resources used by the grid management system. Additional aspects of the present invention will become apparent in the following detailed description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
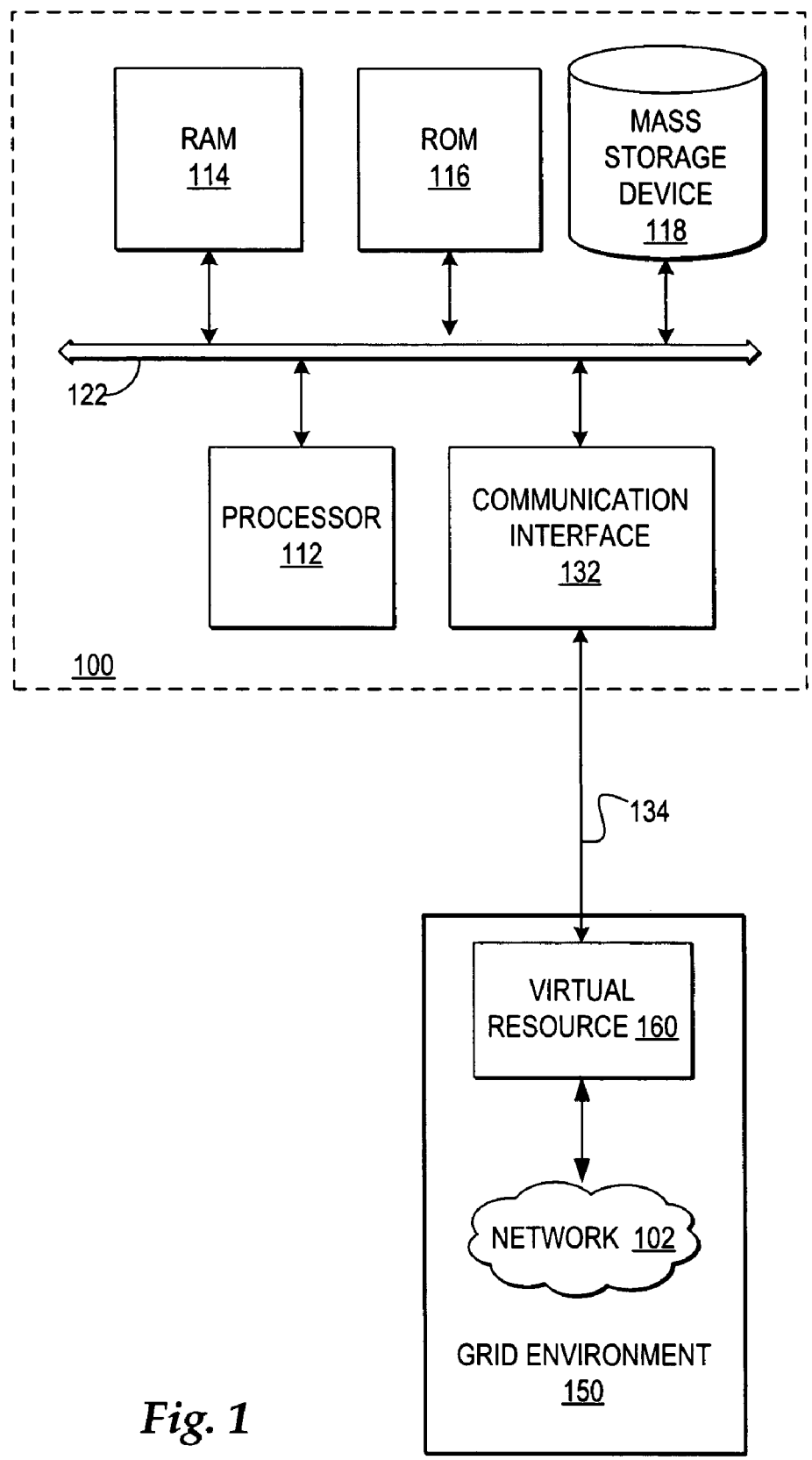
FIG. 1 depicts one embodiment of a computer system which may be implemented in a grid environment and in which the present invention may be implemented.

Referring now to the drawings and in particular to FIG. 1, there is depicted one embodiment of a computer system which may be implemented in a grid environment and in which the present invention may be implemented. As will be further described, the grid environment includes multiple computer systems managed to provide resources. Additionally, as will be further described, the present invention may be executed in a variety of computer systems, including a variety of computing systems, mobile systems, and electronic devices operating under a number of different operating systems managed within a grid environment.

In one embodiment, computer system 100 includes a bus 122 or other device for communicating information within computer system 100, and at least one processing device such as processor 112, coupled to bus 122 for processing information. Bus 122 preferably includes low-latency and higher latency paths that are connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system may provide a graphical user interface (GUI) to the user. In a preferred embodiment, application software contains machine executable instructions that when executed on processor 112 carry out the operations depicted in the flowchart of FIG. 8, and other operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Virtual resource 160 may include a virtual representation of the resources accessible from a single system or systems, wherein multiple systems may each be considered discrete sets of resources operating on independent platforms, but coordinated as a virtual resource by a grid manager. Communications interface 132 provides a two-way data communications coupling to network link 134 that may be connected, for example, to a local area network (LAN), wide area network (WAN), or an Internet Service Provider (ISP) that provide access to network 102. In particular, network link 134 may provide wired and/or wireless network communications to one or more networks, such as network 102, through which use of virtual resources, such as virtual resource 160, is accessible.

As one example, network 102 may refer to the worldwide collection of networks and gateways that use protocols, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information. It will be understood that alternate types of networks, combinations of networks, and infrastructures of networks may be implemented.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

Additionally, although not depicted, multiple peripheral components and internal/external devices may be added to computer system 100, connected to multiple controllers, adapters, and expansion slots coupled to one of the multiple levels of bus 122. For example, a display device, audio device, keyboard, or cursor control device may be added as a peripheral component.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
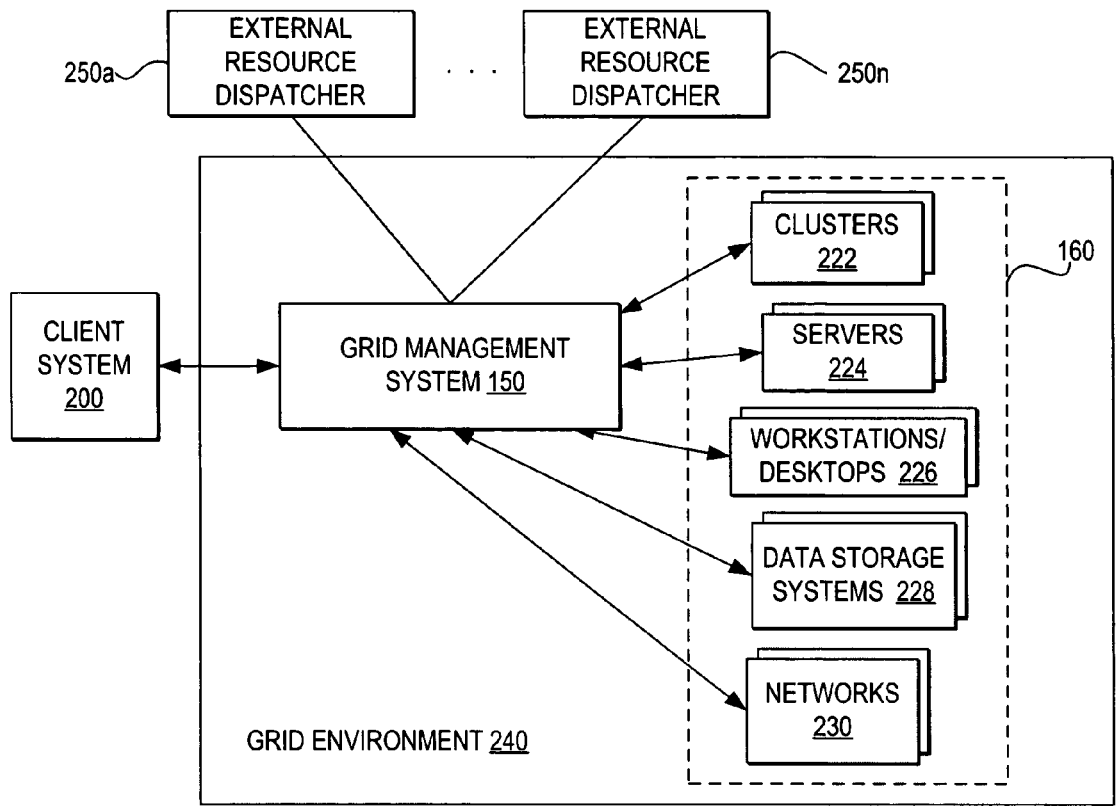
FIG. 2 depicts a block diagram of one embodiment of a client system interfacing with the general types of components within a grid environment.

With reference now to FIG. 2, a block diagram illustrates one embodiment of the general types of components within a grid environment. In the present example, the components of a grid environment 240 include a client system 200 interfacing with a grid management system 150 which interfaces with server clusters 222, servers 224, workstations and desktops 226, data storage systems 228, and networks 230. For purposes of illustration, the network locations and types of networks connecting the components within grid environment 240 are not depicted. It will be understood, however, that the components within grid environment 240 may reside atop a network infrastructure architecture that may be implemented with multiple types of networks overlapping one another. Network infrastructure may range from multiple large enterprise systems to a peer-to-peer system to a single computer system. Further, it will be understood that the components within grid environment 240 are merely representations of the types of components within a grid environment. A grid environment may simply be encompassed in a single computer system or may encompass multiple enterprises of systems.

The central goal of a grid environment, such as grid environment 240 is organization and delivery of resources from multiple discrete systems viewed as virtual resource 160. Client system 200, server clusters 222, servers 224, workstations and desktops 226, data storage systems 228, networks 230 and the systems creating grid management system 150 may be heterogeneous and regionally distributed with independent management systems, but enabled to exchange information, resources, and services through a grid infrastructure enabled by grid management system 150. Further, server clusters 222, servers 224, workstations and desktops 226, data storage systems 228, and networks 230 may be geographically distributed across countries and continents or locally accessible to one another.

In the example, client system 200 interfaces with grid management system 150. Client system 200 may represent any computing system sending requests to grid management system 150. In particular, client system 200 may send job requests and jobs to grid management system 150. Further, while in the present embodiment client system 200 is depicted as accessing grid environment 240 with a request, in alternate embodiments client system 200 may also operate within grid environment 240.

While the systems within virtual resource 160 are depicted in parallel, in reality, the systems may be part of a hierarchy of systems where some systems within virtual resource 160 may be local to client system 200, while other systems require access to external networks. Additionally, it is important to note, that systems depicted within virtual resources 160 may be physically encompassed within client system 200.

One function of grid management system 150 is to manage job requests and jobs from client system 200 and control distribution of each job to a selection of computing systems of virtual resource 160 for use of particular resources at the available computing systems within virtual resource 160. From the perspective of client system 200, however, virtual resource 160 handles the request and returns the result without differentiating between which computing system in virtual resource 160 actually performed the request.

To implement grid environment 240, grid management system 150 facilitates grid services. Grid services may be designed according to multiple architectures, including, but not limited to, the Open Grid Services Architecture (OGSA). In particular, grid management system 150 refers to the management environment which creates a grid by linking computing systems into a heterogeneous network environment characterized by sharing of resources through grid services.

Grid environment 240, as managed by grid management system 150, may provide a single type of service or multiple types of services. For example, computational grids, scavenging grids, and data grids are example categorizations of the types of services provided in a grid environment. Computational grids may manage computing resources of high-performance servers. Scavenging grids may scavenge for CPU resources and data storage resources across desktop computer systems. Data grids may manage data storage resources accessible, for example, to multiple organizations or enterprises. It will be understood that a grid environment is not limited to a single type of grid categorization.

According to an advantage of the present invention, when grid management system 150 detects a need for additional resources beyond the resources registered and included in virtual resource 160, grid management system 150 may send requests for independent external resources to external resource dispatchers, such as external resource dispatchers 250a-250n. Each of external resource dispatchers 250a-250n control a pool of independent external resources.

As will be further described, external resource dispatchers 250a-250n may dispatch independent external resources to grid environment 240 for temporary management by grid management system 150. In particular, the pools of independent external resources preferably remain hidden from grid management system 150 until proper authentication is performed to allow grid management system 150 to temporarily manage sections of independent external resources. External resource dispatchers 250a-250n meter the use of external resources, lock the external resources while in use by grid management system 150, and poll the external resources to ensure connectivity and functionality.

It will be understood that the pools of external resources managed by external resource dispatchers 250a-250n may be accessible by multiple grid management systems. In particular, external resource dispatchers 250a-250n preferably operate independent of any one grid environment and are self-registering with a directory of external resource dispatchers.

Figure 3:
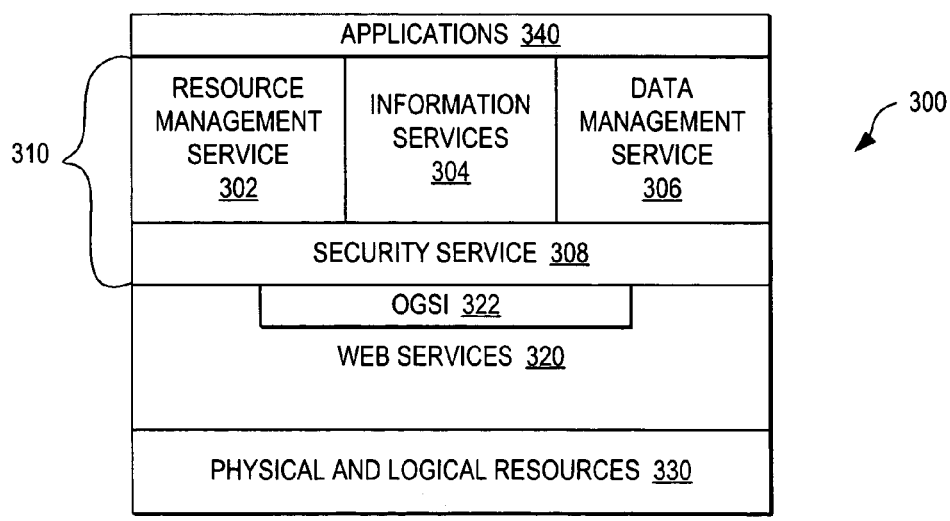
FIG. 3 depicts a block diagram of one example of an architecture that may be implemented in a grid environment.

Referring now to FIG. 3, a block diagram illustrates one example of an architecture that may be implemented in a grid environment. As depicted, an architecture 300 includes multiple layers of functionality. As will be further described, the present invention is a process which may be implemented in one or more layers of an architecture, such as architecture 300, which is implemented in a grid environment, such as the grid environment described in FIG. 2. It is important to note that architecture 300 is just one example of an architecture that may be implemented in a grid environment and in which the present invention may be implemented. Further, it is important to note that multiple architectures may be implemented within a grid environment.

Within architecture 300, first, a physical and logical resources layer 330 organizes the resources of the systems in the grid. Physical resources include, but are not limited to, servers, storage media, and networks. The logical resources virtualize and aggregate the physical layer into usable resources such as operating systems, processing power, memory, I/O processing, file systems, database managers, directories, memory managers, and other resources.

Next, a web services layer 320 provides an interface between grid services 310 and physical and logical resources 330. Web services layer 320 implements service interfaces including, but not limited to, Web Services Description Language (WSDL), Simple Object Access Protocol (SOAP), and eXtensible mark-up language (XML) executing atop an Internet Protocol (IP) or other network transport layer. Further, the Open Grid Services Infrastructure (OSGI) standard 322 builds on top of current web services 320 by extending web services 320 to provide capabilities for dynamic and manageable Web services required to model the resources of the grid. In particular, by implementing OGSI standard 322 with web services 320, grid services 310 designed using OGSA are interoperable. In alternate embodiments, other infrastructures or additional infrastructures may be implemented a top web services layer 320.

Grid services layer 310 includes multiple services. For example, grid services layer 310 may include grid services designed using OGSA, such that a uniform standard is implemented in creating grid services. Alternatively, grid services may be designed under multiple architectures. Grid services can be grouped into four main functions. It will be understood, however, that other functions may be performed by grid services.

First, a resource management service 302 manages the use of the physical and logical resources. Resources may include, but are not limited to, processing resources, memory resources, and storage resources. Management of these resources includes receiving job requests, scheduling job requests, distributing jobs, and managing the retrieval of the results for jobs. Resource management service 302 preferably monitors resource loads and distributes jobs to less busy parts of the grid to balance resource loads and absorb unexpected peaks of activity. In particular, a user may specify preferred performance levels so that resource management service 302 distributes jobs to maintain the preferred performance levels within the grid.

Second, information services 304 manages the information transfer and communication between computing systems within the grid. Since multiple communication protocols may be implemented, information services 304 preferably manages communications across multiple networks utilizing multiple types of communication protocols.

Third, a data management service 306 manages data transfer and storage within the grid. In particular, data management service 306 may move data to nodes within the grid where a job requiring the data will execute. A particular type of transfer protocol, such as Grid File Transfer Protocol (GridFTP), may be implemented.

Finally, a security service 308 applies a security protocol for security at the connection layers of each of the systems operating within the grid. Security service 308 may implement security protocols, such as Open Secure Socket Layers (SSL), to provide secure transmissions. Further, security service 308 may provide a single sign-on mechanism, so that once a user is authenticated, a proxy certificate is created and used when performing actions within the grid for the user.

Multiple services may work together to provide several key functions of a grid computing system. In a first example, computational tasks are distributed within a grid. Data management service 306 may divide up a computation task into separate grid services requests of packets of data that are then distributed by and managed by resource management service 302. The results are collected and consolidated by data management system 306. In a second example, the storage resources across multiple computing systems in the grid are viewed as a single virtual data storage system managed by data management service 306 and monitored by resource management service 302.

An applications layer 340 includes applications that use one or more of the grid services available in grid services layer 310. Advantageously, applications interface with the physical and logical resources 330 via grid services layer 310 and web services 320, such that multiple heterogeneous systems can interact and interoperate.

Figure 4:
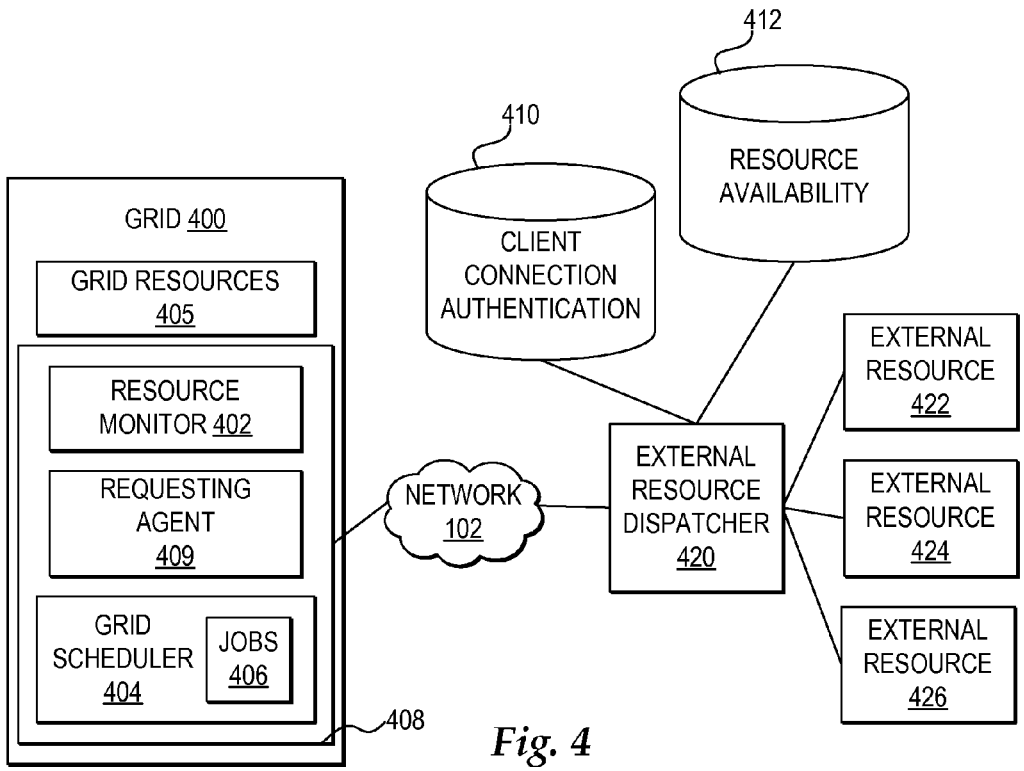
FIG. 4 depicts an illustrative representation of one embodiment of a grid management system interacting with an external resource dispatcher in accordance with the method, system, and program of the present invention.

With reference now to FIG. 4, an illustrative representation depicts one embodiment of a grid management system interacting with an external dispatcher in accordance with the method, system, and program of the present invention.

Within a grid environment, such as grid 400, a grid management system 408 manages grid resources 405 registered and available within grid 400. In particular, grid management system 408 may include multiple grid management components distributed across multiple resources. In the example, however, logically, grid management system 408 includes a resource monitor 402 for registering and monitoring resource availability. In addition, grid management system 408 includes a grid scheduler 404 that controls the scheduling and distribution of jobs to grid resources 405. Grid scheduler 404 also manages time synchronization between the various resources handling a particular job. The status and results of jobs are tracked within a job queue 406.

A requesting agent 409 within grid management system 408 requests external resources from external resource dispatcher 420 via network 102. While in the example depicted there is a single external resource dispatcher, it will be understood that requesting agent 409 may send requests for external resources to multiple external resource dispatchers. In addition, requesting agent 409 may access a directory of external resource dispatchers, where the directory indicates the types of resources, costs, performance specifications, and other information about the external resource pools controlled by each of the external resource dispatchers in the directory.

In the embodiment depicted, external resource dispatcher 420 manages the distribution of a pool of external resources, such as external resources 422, 424, and 426, to requesting grid clients. External resources 422, 424, and 426 may include, but are not limited to, non-grid computing systems or another grid which presents itself as a resource that can be requested as an external resource.

In particular, when requesting agent 409 requests external resources from external resource dispatcher 420, the actual resources are hidden grid management system 408 until proper authentication is performed. In particular, responsive to receiving a request for external resources, external resource dispatcher 420 may determine if a client requesting external resource is authenticated. A client connection authentication database 410 preferably stores the identity information needed to authenticate registered clients. In addition, as a client uses resources, the metered use may be added to the client connection authentication database entries, such that if a client registers for a limited amount of resources, that resource use is calculated and updated in client connection authentication database 410. Table 1 depicts an example of the types of information that may be included in client connection authentication database 410. It will be understood that multiple types of identity authentication may be performed including, but not limited to, public/private key encryption authentication.

TABLE 1

Example Client Connection Authentication Database Entries

| Grid client ID | Grid Client Key | Resource Authorization |
|---|---|---|
| Grid A | ghd3k4 | All |
| Grid B | erk20we | Processing power |
| Grid C | dkd3k3 | All; 1 hour per day |

In addition, in responsive to receiving a request for external resources, external resource dispatcher 420 determines whether there are resources available to meet the external resource request. A resource availability database 412 preferably maintains a table of the current external resource availability and information including, but not limited to, IP address, resource types, resource capacity, cost, and special resource. In addition, the rights and privileges for each resource are preferably included for each resource entry in resource availability table 412. Table 2 depicts an example of some of the types of information that may be included in resource availability database 412.

TABLE 2

Example Resource Availability Database Entries

| Type | IP Address | Capacity | Cost |
|---|---|---|---|
| Processing | 23.14.202.101 | 4 GHz | .05 per second |
| Processing | 23.14.320.230 | 10 GHz | .10 per second |
| Disk space | 20.10.100.202 | 100 GB | $8.00 per GB |

One advantage of using external resource dispatcher to distribute external grid resources is that external resource dispatcher 420 is self registering and self-metering. Thus, external resource dispatcher 420 can register as an external controller independent of any one grid. In addition, external resource dispatcher 420 can independent monitor the use of external resources by grid clients.

Figure 5:
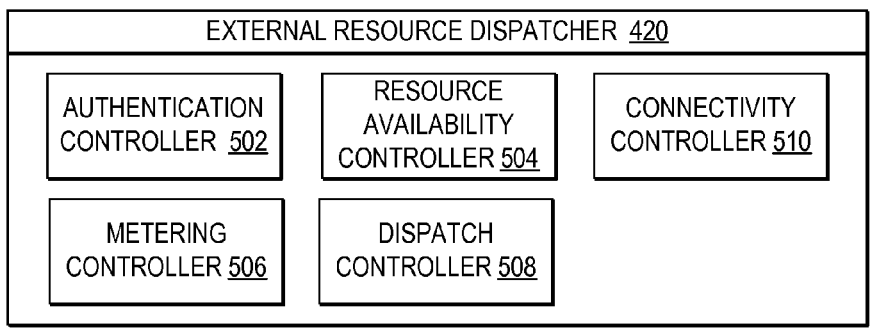
FIG. 5 depicts a block diagram of the components of an external resource dispatcher in accordance with the method, system, and program of the present invention.

Referring now to FIG. 5, there is depicted a block diagram of the components of an external resource dispatcher in accordance with the method, system, and program of the present invention. As depicted, an authentication controller 502 within external resource dispatcher 420 controls authentication of a grid client and the resource a grid client is authorized to request. A resource availability controller 504 registers external resources into an external resource pool and updates the status of the resources as they are used. In addition, when an external resource is dispatched to a grid client, resource availability controller 504 preferably locks the external resource against other use. A dispatch controller 508 controls the dispatch of the registered external resources to authenticated grid clients by communicating with the grid client and the external resources. A metering controller 506 controls the metering of the use and costs associated with use of external resource by grid clients. In addition, a connectivity controller 510 monitors heartbeats from the external resource and the grid client to ensure connectivity of an external resource to a grid client and to detect failed external resources. If connectivity is no longer detected, then connectivity controller 510 may alert metering controller 506 to stop metering for use of the external resource and alert dispatch controller 508 to retrieve the resource. If a failed external resource is detected, then connectivity controller 510 alerts dispatch controller 508 to retrieve the failed resource and dispatch a replacement resource. It will be understood that additional operational controllers, database, and other components may be included in external resource dispatcher 420.

Figure 6:
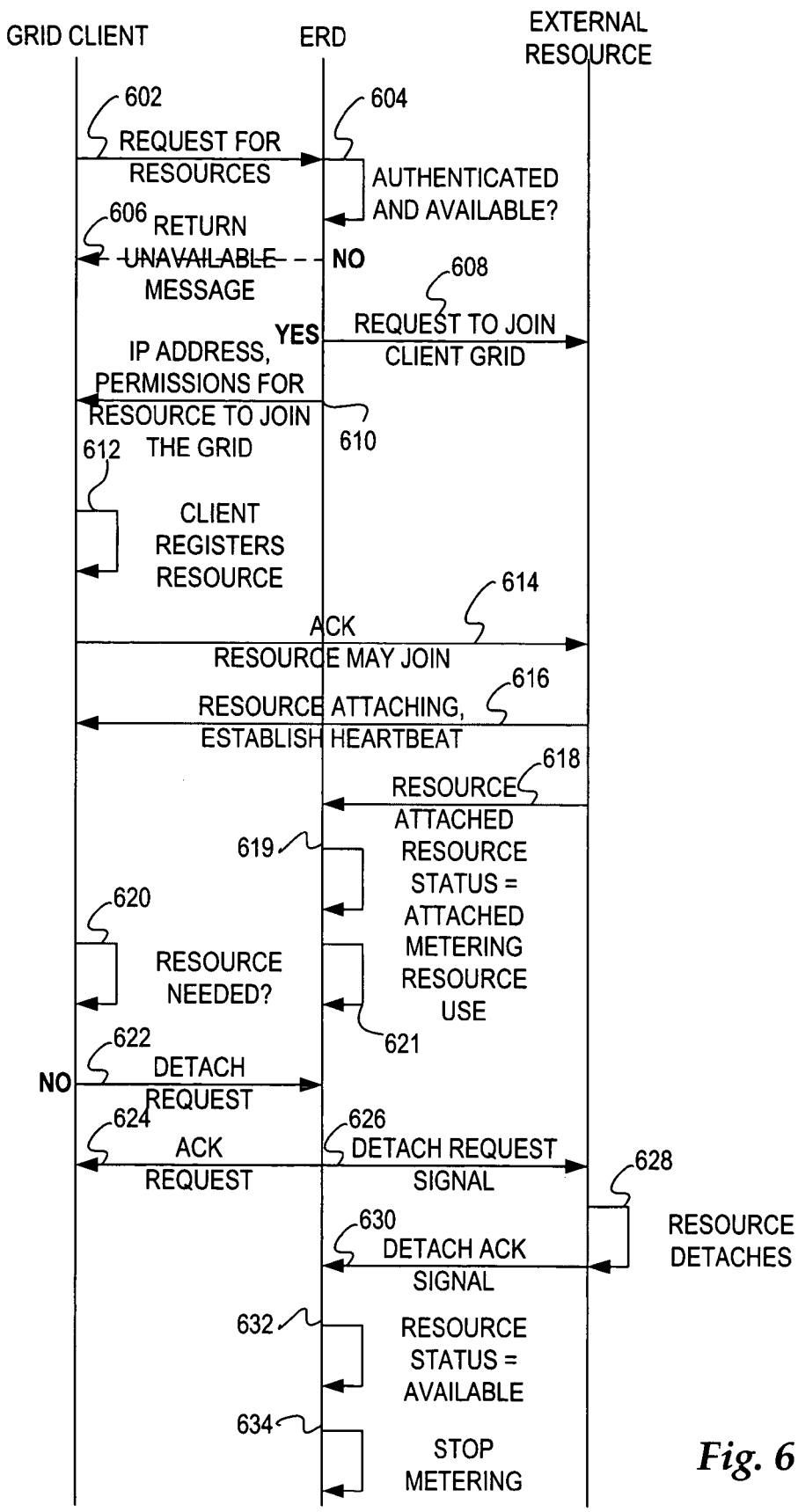
FIG. 6 depicts a flow diagram of the connections and communication implemented between a grid client, an external resource dispatcher, and an external resource.

With reference now to FIG. 6, there is depicted a flow diagram of the connections and communication implemented between a grid client, an external resource dispatcher, and an external resource. As depicted at reference numeral 602, a grid client sends a request for resources to an external resource dispatcher (ERD). At this point, the grid client has reached a resource threshold for one or more resources and needs external resources such as process power, storage space, or other external resources. Next, as depicted at reference numeral 604, the ERD authenticates the grid client and determines whether external resources are available to meet the request. If the grid client is not authenticated or no external resource are available to meet the request, then an "unavailable" message is returned to the grid client, as depicted at reference numeral 606. If the grid client is authenticated and external resource are available to meet the request, then a request is send to the selected external resource to join the grid, as depicted at reference numeral 608.

Next, as depicted at reference numeral 610, the network address and permissions for the resource to join the grid client are sent to the grid client. As depicted at reference numeral 612, the grid client will register the resource in the resource directory managed by the grid client resource management system. Next, as depicted at reference numeral 614, the grid client sends an acknowledgement (ACK) that the resource may join the grid client to the external resource. Thereafter, as depicted at reference numeral 616, the external resource attaches to the grid client and establishes a heartbeat to the external resource and the grid client. As depicted at reference numeral 618, the external resource notifies the ERD that the resource has attached to the grid client.

After the external resource attaches to the grid client, the grid client monitors whether the resource is needed, as depicted at reference numeral 620, and the ERD meters resource use, as depicted at reference numeral 621. When the grid client no longer needs the external resource, the grid client sends the ERD a detach request, as depicted at reference numeral 622. The ERD then sends an acknowledgement of the request from the grid client, as depicted at reference numeral 624, and sends a detach request signal to the external resource, as depicted at reference numeral 626. The external resource then detaches, as depicted at reference numeral 628 and the external resource sends a detach acknowledge signal to the ERD, as depicted at reference numeral 630. The ERD then updates the external resource status to available, as depicted at reference numeral 632, and stops metering, as depicted at reference numeral 634.

In addition, although not depicted, once a heartbeat is established between the ERD and the grid client, the ERD monitors connectivity and will retrieve the dispatched external resource if connectivity is no longer detected. In addition, once a heartbeat is established between the ERD and the dispatched external resource, the ERD monitors for failure and will retrieve the dispatched external resource and replace it with an active external resource if failure is detected.

Figure 7:
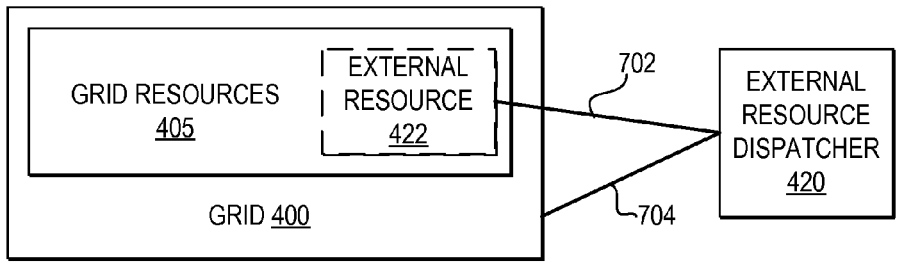
FIG. 7 depicts an illustrative representation of an external resource dispatched to a grid in accordance with the method, system, and program of the present invention.

Referring now to FIG. 7, there is depicted an illustrative representation of an external resource dispatched to a grid in accordance with the method, system, and program of the present invention. As depicted in the example, external resource 422 from FIG. 4 is dispatched to grid 400. In particular, once external grid 422 joins grid 400, external resource 422 is logically part of grid resource 405 of grid 400. Resource manager 402 will manage resource 422 and job scheduler 404 will control scheduling and distribution of jobs to resource 422. In addition, resource manager 402 will control the return of external resource 422 to external resource dispatcher 420 when external resource 422 is no longer needed for job scheduler 404.

When an external resource managed by external resource dispatcher 420 is dispatched to a client grid, such as grid 400, preferably, heartbeats are established from external resource dispatcher 420 to grid 400 and to external resource 422. In the example, a heartbeat 502 is depicted connecting external resource 422 with external resource dispatcher 420. Heartbeat connection 502 allows external resource dispatcher 420 to monitor when a resource has failed. In addition, a heartbeat 504 is depicted connecting grid 400 with external resource dispatcher 420. In particular, heartbeat connection 504 allows external resource dispatcher 420 to monitor whether there is connectivity between grid 400 and external resource 422.

Figure 8:
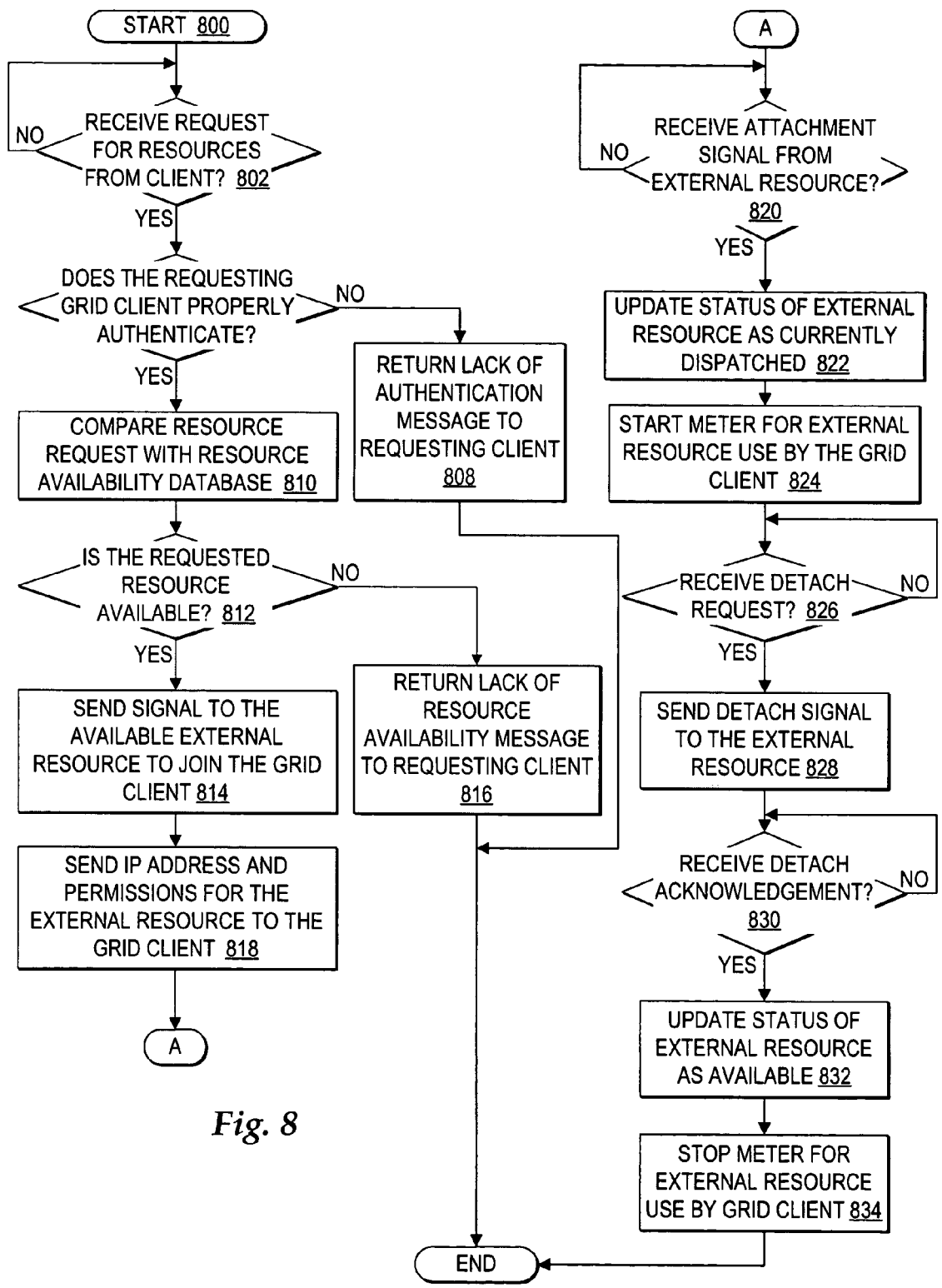
FIG. 8 depicts a high level logic flowchart of a process and program for controlling an external resource dispatcher in accordance with the method, system, and program of the present invention.

With reference now to FIG. 8, there is depicted a high level logic flowchart of a process and program for controlling an external resource dispatcher in accordance with the method, system, and program of the present invention. As depicted, the process starts at block 800 and thereafter proceeds to block 802. Block 802 depicts a determination whether a request for resource is received from a grid client. As long as a request for resources is not received from a grid client, then the process iterates at block 802. If a request for resources is received from a grid client, then the process passes to block 804.

Block 804 depicts a determination whether the requesting grid client is properly authenticated. If the requesting grid client is not properly authenticated, then the process passes to block 808. Block 808 depicts returning a lack of authentication message to the requesting grid client, and the process ends. If the request grid client is properly authenticated, then the process passes to block 810.

Block 810 depicts comparing the resource request with the resource available in the resource availability database. Next, block 812 illustrates a determination whether the requested resource is available. If the requested resource is not available, then the process passes to block 816.

Block 816 depicts returning a lack of resource availability message to the requesting grid client. If the requested resource is available, then the process passes to block 814. Block 814 depicts sending a signal to the available external resource to joint the grid client. Next, block 818 depicts sending the IP address and permission for the external resource to the grid client. Thereafter, block 820 depicts a determination whether an attachment signal is received from the external resource. The process iterates at block 820 until an attachment signal is received. Alternatively, if no attachment signal is received, after a particular time, the process may time out. If an attachment signal is received, then the process passes to block 822.

Block 822 depicts updating the status of the external resource as currently dispatched. Next, block 824 depicts starting metering of use of the external resource by the grid client. Thereafter, block 826 depicts a determination whether a detach request is received. If a detach request is not received, then the process iterates at block 826. A detach request may also be invoked if the external resource dispatcher does not detect a heartbeat from a resource or from a grid connection to a resource. In addition, a detach request may also be invoked if the period of time allowed in the privileges for the grid client to use a resource expires. Once a detach request is received, the process passes to block 828.

Block 828 depicts sending a detach signal to the external resource. Next, block 830 depicts a determination whether a detach acknowledge is received from the external resource. The process iterates at block 830 until a detach acknowledge is received and then passes to block 832. Block 832 depicts updating the status of the external resource as available. Next, block 834 depicts stopping the metering for use of the external resource by the grid client, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for coordinating use of independent external resources within a grid environment, comprising:
    enabling a grid environment comprising a plurality of computing systems each comprising at least one resource and communicatively connected over a network through a grid management system to share each said at least one resource through a plurality of web services comprising simple object access protocol, web services description language, and extensible mark-up language interfaces implemented within a web service layer extended by an open grid services infrastructure atop a grid service layer implemented within an open grid services architecture;

self-registering, by an external resource dispatcher, with said grid management system and at least one additional grid management system;

receiving, at said external resource dispatcher, a request for resources from said grid management system, wherein said grid management system registers each said at least one resource for use within said grid environment, wherein a plurality of external resources are managed by said external resource dispatcher independent from each said at least one resource registered by said grid management system;

coordinating dispatch by said external resource dispatcher of a selection of external resources from among said plurality of external resources for temporary registration with said grid management system by said external resource dispatcher sending a request to said selection of external resources to join said grid environment and sending at least one network address and permission for said selection of external resources to said grid management system, such that use of said selection of external resources is coordinated when said plurality of grid resources already registered for use within said a grid environment are insufficient;

responsive to said grid management system receiving said at least one network address and permission for said selection of external resources, sending by said grid management system an acknowledgement to said selection of external resources to invite said selection of external resources to join said grid environment;

responsive to said selection of external resources receiving said acknowledgement from said grid management system, attaching by said external resources to said grid management system and directing by said external resources said external resource dispatcher to monitor a connectivity heartbeat between said selection of external resources and said grid management system;

responsive to said external resource dispatcher detecting said direction to monitor said connectivity heartbeat from said external resources attached to said grid management system, metering the use of said selection of external resources by said grid management system and monitoring said connectivity heartbeat between said grid management system and said selection of external resources; and responsive to said external resource dispatcher detecting a failed network connectivity heartbeat from said grid management system or said selection of external resources, retrieving said selection of external resources from said grid environment and stopping said metering of said user of said selection of external resources.

2. The method according to claim 1 for coordinating use of independent external resources within a grid environment, said method further comprising:
authenticating, by said external resource dispatcher, said grid management system as an authorized recipient of said plurality of external resources.

3. The method according to claim 1 for coordinating use of independent external resources within a grid environment, said method further comprising:
tracking, by said external resource dispatcher, an availability of each of said plurality of external resources.

4. The method according to claim 1 for coordinating use of independent external resources within a grid environment, said method further comprising:
independently registering with an external resource dispatcher directory comprising a plurality of external resource dispatchers.

5. The method according to claim 1 for coordinating use of independent external resources within a grid environment, said method further comprising:
enabling said external resource dispatcher to receive requests for external resources from a plurality of diverse grid management systems.

* * * * *

UNITED STATES PATENT AND TRADEMARK OFFICE
CERTIFICATE OF CORRECTION

PATENT NO.        : 7,584,274 B2                                    Page 1 of 1
APPLICATION NO.   : 10/868542
DATED             : September 1, 2009
INVENTOR(S)       : Bond et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1172 days.

Signed and Sealed this

Fourteenth Day of December, 2010

David J. Kappos
*Director of the United States Patent and Trademark Office*